July 20, 1954     A. E. CHURCH     2,684,251
ROTATABLY MOUNTED WORK CLAMPING CHUCK
Filed May 3, 1950
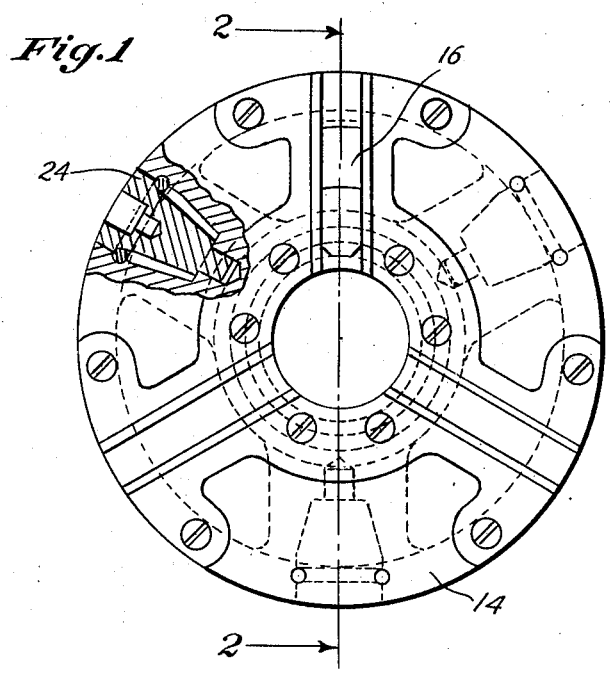
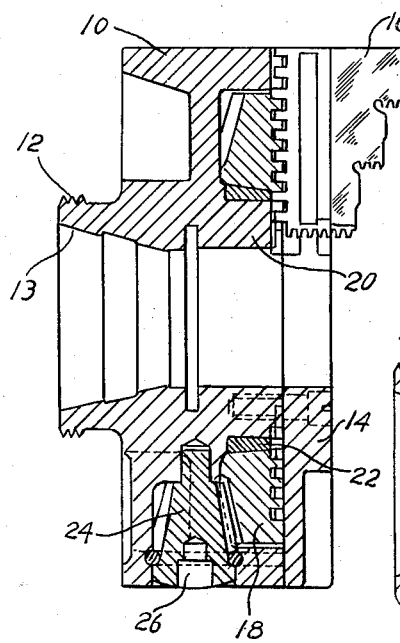
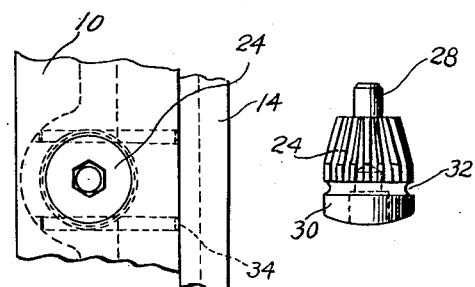
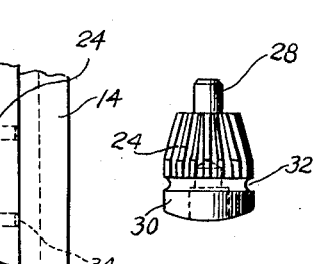
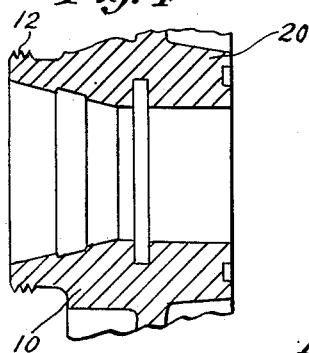
INVENTOR
Albert E. Church
BY
ATTORNEY

Patented July 20, 1954

2,684,251

UNITED STATES PATENT OFFICE 2,684,251

ROTATABLY MOUNTED WORK CLAMPING CHUCK

Albert E. Church, New Britain, Conn., assignor to Union Manufacturing Company, New Britain, Conn., a corporation of Connecticut Application May 3, 1950, Serial No. 159,750

1 Claim. (Cl. 279—116)

This invention relates to rotatably mounted work clamping chucks and more particularly to means within the body of the chuck for rotatably supporting and operating the jaw operating member such as a scroll.

A primary object of the invention is to provide an improved chuck body adapted to be rotatably supported for rotation co-axially with a machine tool spindle and having a body member formed with a central hub or projection on which is rotatably mounted a jaw operating scroll, with or without an annular wear resisting member between the hub and the scroll.

Another object of the invention is to provide an improved retaining means for the jaw operating pinion housed radially within the body member and meshing with the scroll member.

A feature of the invention that is important and which permits the above named objects to be accomplished is that the front portion or end of the body member is formed with an annular recess to form an annular space for the jaw operating scroll and forming a central concentric hub portion and a peripheral flange. On the central hub or projection portion of the body member is a rotatably mounted jaw operating scroll, and within the annular flange is provided means to retain the jaw operating pinion in proper position and for rotation with its teeth in mesh with gear teeth on the scroll member.

With the above and other objects in view, the invention includes the features of construction and operation set forth in the following specification and illustrated in the accompanying drawing.

In the accompanying drawing annexed hereto and forming a part of this specification, I have shown the invention in what is now thought to be one of its preferred forms, but it will be understood that the invention can be otherwise embodied and that the drawing is not to be construed as defining or limiting the scope of the invention, the claim appended to this specification being relied upon for that purpose.

In the drawing:

Fig. 1 is a front elevation of a chuck embodying the present invention;

Fig. 2 is a central sectional view taken on the plane of line 2—2 in Fig. 1;

Fig. 3 is a fragmentary side elevation of the body member showing a scroll operating pinion and retaining means therefor;

Fig. 4 is a partial longitudinal sectional view of the body member showing another form of the projection or hub for mounting the scroll member, and Fig. 5 is a side elevation of one of the scroll operating pinions.

Referring more in detail to the figures of the drawing and first to the form of the invention as shown in Figs. 1 and 2, it will be seen that the chuck comprises a body member 10 adapted for attachment to a machine tool spindle or other rotary member in any preferred manner as by means of the screw threads 12 concentric with the tapered opening 13 for positioning the chuck on its spindle (not shown). Mounted for radial movement on the front face member 14 of the chuck 10 are work clamping jaws 16, three of these jaws being indicated in Fig. 1. These jaws 16 may be simultaneously actuated in the usual manner by means of the scroll member 18 housed within the body member 10. For this purpose the rear faces of the jaws 16 are provided with arcuate teeth which engage the spiral projections on the scroll face of the member 18.

To rotatably support the scroll member 18 the body member 10 is provided with an integral forwardly extending projection or hub 20 co-axial with the body member. This projection 20 may if desired be surrounded with a steel or other wear resisting ring 22 secured to the projection 20 by being pressed firmly thereon. For this form of mounting for the scroll the outer surface of the wear resisting ring 22 on which the scroll rotates is made slightly conical and the outer surface of the projection over which the ring is pressed is made cylindrical. If, however, the body member 10 of the chuck is of steel no band 22 may be needed and the outer surface of the integral projection may be slightly conical as shown in Fig. 4.

To manually operate the scroll 18 one or more pinions 24 may be mounted radially within the body portion 10 and having their bevelled teeth meshing with teeth formed on the rear face of the scroll member 18. Within the outer end of these pinions 24 is a wrench receiving recess 26. At the forward end of the pinions is a cylindrical pilot or extension 28 to support the inner end and at the outer end of the pinions is a cylindrical bearing surface 30 closely but rotatably engaging the pinion receiving opening.

To retain the pinions 24 in their operative positions each is provided with an annular groove 32 adjacent its outer end. Engaging these grooves are pairs of pins 34 one pair for each pinion. The pins 34 are placed in drilled holes in the body member 10 to engage a groove on opposite sides of the pinion 24 and are completely enclosed by the front plate. The pinions 24 are therefor symmetrically engaged and retained by the pins 34. The pins 34 as shown in Figs. 2 and 3 enter the peripheral flange of the body member and extend to the front surface of the body member 10 where they are prevented from being removed by the front plate 14.

By the provision of the tapered surface on the projection 20 or on the bearing ring 22 the scroll 18 which has its central opening similarly tapered may be taken up slightly when worn. Also, a new scroll and ring properly fitting each other may be substituted by removing the worn ring and replacing it by pressing the new one over the cylindrical surface of the projection.

I claim as my invention:

A chuck having a body member and a front plate, radially movable jaws within said front plate, a scroll member rotatable within said body member for operating said jaws, a pinion having a circumferential groove radially mounted within the body member and rotatable to operate said scroll and jaws, and pins secured within said body member and engaging the circumferential groove formed in said opinion, said pins engaging said groove on opposite sides of said pinion and being enclosed by and being prevented from being removed by said front plate.

References Cited in the file of this patent

UNITED STATES PATENTS

| Number | Name | Date |
|---|---|---|
| 422,480 | Whiton | Mar. 4, 1890 |
| 642,658 | Whiton | Feb. 6, 1900 |
| 800,272 | Cowles | Sept. 26, 1905 |
| 1,013,373 | Church | Jan. 2, 1912 |
| 1,046,523 | Whiton | Dec. 10, 1912 |
| 1,269,991 | Woodford et al. | June 18, 1918 |
| 1,520,969 | Smort | Dec. 30, 1924 |
| 2,101,926 | Wettig | Dec. 14, 1937 |
| 2,154,908 | Lewis | Apr. 18, 1939 |
| 2,213,653 | Lisbon | Sept. 3, 1940 |
| 2,457,030 | Bugatti | Dec. 21, 1948 |
| 2,597,489 | Huntting | May 20, 1952 |

FOREIGN PATENTS

| Number | Country | Date |
|---|---|---|
| 346,648 | Germany | Jan. 3, 1922 |